(12) United States Patent
Chang et al.

(10) Patent No.: US 6,746,025 B1
(45) Date of Patent: Jun. 8, 2004

(54) ROCKER HORSE HAVING MOVABLE CONFIGURATION

(76) Inventors: Yun Chi Chang, 10F-1, No. 262, Sec. 2, Hua Mei Street, North Dist., Taichung 404 (TW); Kang Ho Choi, No. 301, Huyundai Town, #1392-36, Kwan-Yang Dong, An-Yang City, Kyung-Ki Do (KR), 430-060

( * ) Notice: Subject to any disclaimer, the term of this patent is extended or adjusted under 35 U.S.C. 154(b) by 0 days.

(21) Appl. No.: 10/298,120

(22) Filed: Nov. 18, 2002

(51) Int. Cl.[7] .............................................. A63G 13/06
(52) U.S. Cl. .................................. 280/1.175; 280/1.181
(58) Field of Search ...................... 280/1.175, 1.181, 280/47.12, 1.13, 1.182, 1.184

(56) References Cited

U.S. PATENT DOCUMENTS

| | | | | |
|---|---|---|---|---|
| 256,390 A | * | 4/1882 | Shepardson | 280/1.23 |
| 1,331,664 A | * | 2/1920 | Noyes | 280/1 |
| 1,339,493 A | * | 5/1920 | Bellairs | 280/1.175 |
| 1,431,214 A | | 10/1922 | Burgess | |
| 1,907,848 A | * | 5/1933 | Martin | 280/1.175 |
| 2,448,390 A | * | 8/1948 | Pugh | 280/1.175 |
| 2,597,668 A | * | 5/1952 | Pelley | 280/1.175 |
| 3,848,869 A | * | 11/1974 | Morrison | 280/1.22 |
| 4,494,763 A | * | 1/1985 | Whitehead | 280/1.175 |
| 5,022,667 A | | 6/1991 | Gillson | 280/1.188 |
| 5,466,191 A | * | 11/1995 | Chang | 472/95 |

* cited by examiner

*Primary Examiner*—Daniel G. DePumpo
(74) *Attorney, Agent, or Firm*—Charles E. Baxley

(57) ABSTRACT

A rocker device includes a base having a rocker surface for rocking on a supporting surface, and a wheel device attached to the base and partially extendible out of the bottom of the base to selectively engage with the supporting surface. The base is rockable relative to the supporting surface when the wheel device is disengaged from the supporting surface, and the base is movable relative to the supporting surface when the wheel device is engaged with the supporting surface, such that the rocker device may be moved periodically on the supporting surface.

11 Claims, 3 Drawing Sheets

ROCKER HORSE HAVING MOVABLE CONFIGURATION

BACKGROUND OF THE INVENTION

1. Field of the Invention

The present invention relates to a hobby or rocker horse, and more particularly to a hobby or rocker horse having a wheel device for allowing the rocker horse to be moved relative to the supporting surface or ground.

2. Description of the Prior Art

Typical hobby or rocker toy devices, such as the rocking seats, the rocking horses, and the like are well known and comprise a base having a curved or rocker surface for allowing the rocker toy devices to conduct the typical rocking exercises or operations.

U.S. Pat. No. 1,431,214 to Burgess, and U.S. Pat. No. 5,022,667 to Gillson disclose two of the typical rocker toy devices or rocking horses, and comprise a seat that is changeable between a normal rocker configuration and a normal vehicular configuration.

However, while in the normal rocker configuration, the rocker toy devices or rocking horses may only be used to conduct the rocking operation, and may not be moved relative to the supporting surface or ground.

On the contrary, while in the normal vehicular configuration, the rocker toy devices or rocking horses may only be used to move as the vehicles, but may not be used to conduct the rocking operation.

The present invention has arisen to mitigate and/or obviate the afore-described disadvantages of the conventional rocker horses.

SUMMARY OF THE INVENTION

The primary objective of the present invention is to provide a hobby or rocker horse including a wheel device arranged for allowing the rocker horse to be moved relative to the supporting surface or ground, and also to be operated with in rocking operations.

In accordance with one aspect of the invention, there is provided a rocker device comprising a body, such as a toy body or a hobby horse body including a base having at least one rocker surface provided in bottom thereof for engaging with a supporting surface and for providing rocking motion of the horse body, and a wheel device attached to the bottom of the base and extended outwardly relative to the bottom of the base to selectively engage with the supporting surface. The base is rockable relative to the supporting surface at a position where the wheel device is elevated and disengaged from the supporting surface, and another position where the wheel device is engaged with the supporting surface. The horse body may conduct the rocking operation with the rocker surface when the wheel device is disengaged from the supporting surface, and may be moved relative to the supporting surface when the wheel device is engaged or contacted with the supporting surface, such that the horse body may be periodically moved relative to the supporting surface with the wheel device.

The wheel device includes at least one first wheel partially extended out of the base at a partially and outwardly extending position, to engage with the supporting surface. For example, the wheel device includes a frame, the first wheel is rotatably secured to the frame.

The frame is preferably rotatably secured to the base with a pivot shaft, and includes a tube attached thereto, and an axle rotatably secured to the tube, the first wheel is attached to the axle. For example, the frame includes a pipe secured thereto to rotatably receive the pivot shaft in the pipe.

A stop rod may further be provided and secured to the base and engageable with the frame, to position the first wheel at the partially and outwardly extending position.

One or more second wheels may further be provided and rotatably secured to the frame and spaced away from the first wheel. For example, the frame may include a further tube attached thereto, and a spindle rotatably received in the further tube, the second wheel is secured to the spindle. The base may include a chamber formed therein for receiving the second wheel.

A stop pole may further be provided and secured to the base and engageable with the frame, to limit a movement of the second wheel relative to the base.

The frame includes a first end having the first wheel secured thereto, and a second end having the second wheel secured thereto. The the pivot shaft is preferably provided between the first wheel and the second wheel, and the first wheel is preferably further spaced away from the pivot shaft than the second wheel.

The second wheel may be arranged to be contacted with the supporting surface when the first wheel is contacted with the supporting surface.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
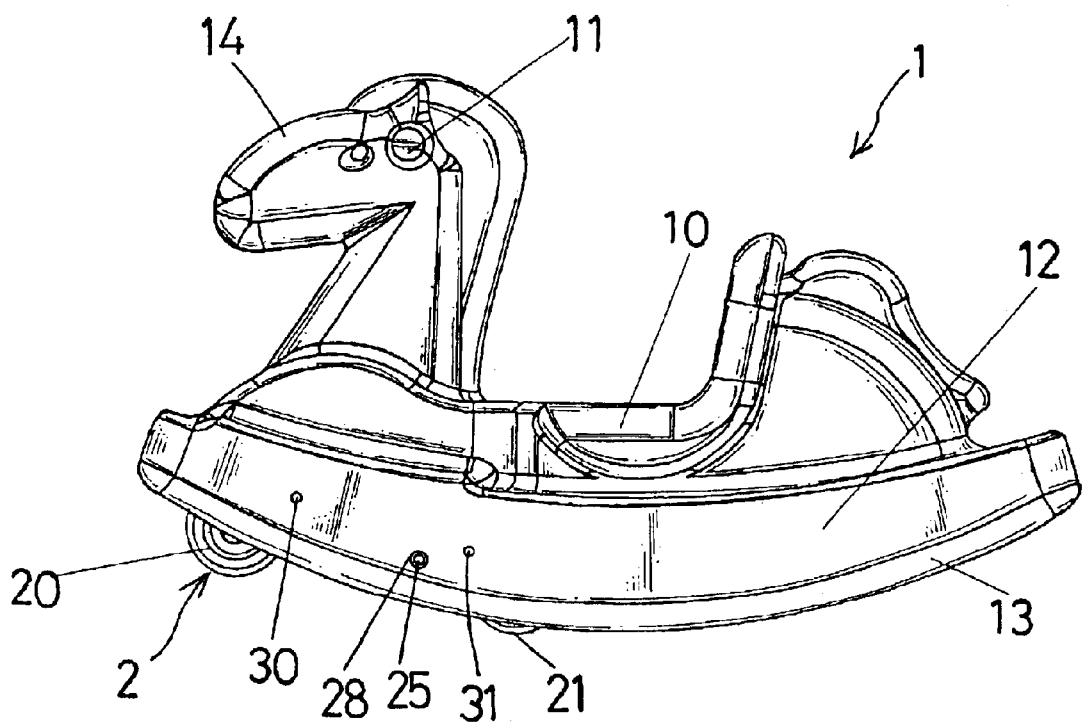
FIG. 1 is a side plan view of a rocker horse in accordance with the present invention.
Figure 2:
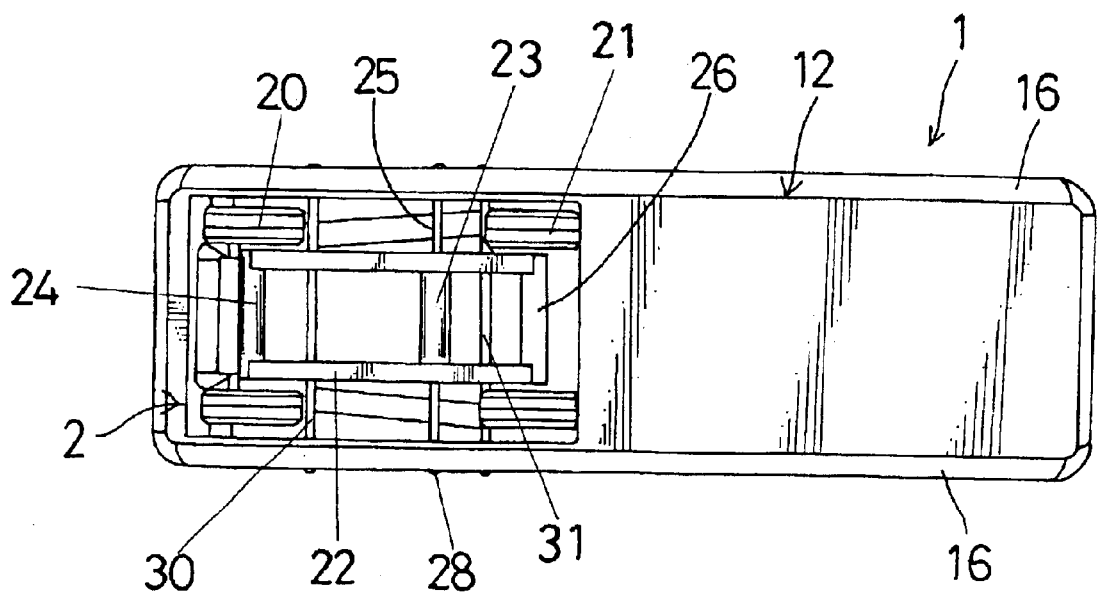
FIG. 2 is a bottom plan view of the rocker horse.
Figure 3:
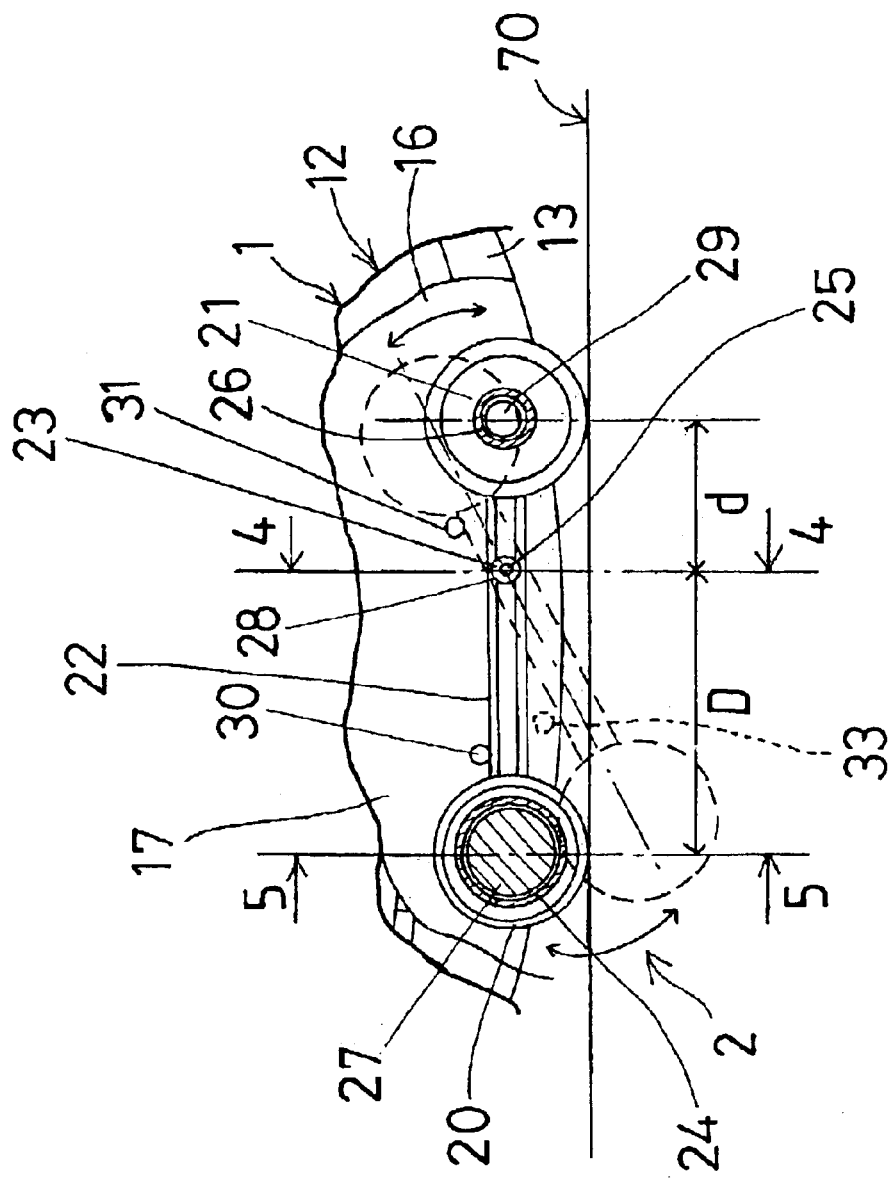
FIG. 3 is a partial cross sectional view, in which one side wall of the rocker horse has been partially cut off for illustrating the inner configuration of the rocker horse, and for illustrating the operation of the rocker horse.
Figure 4:
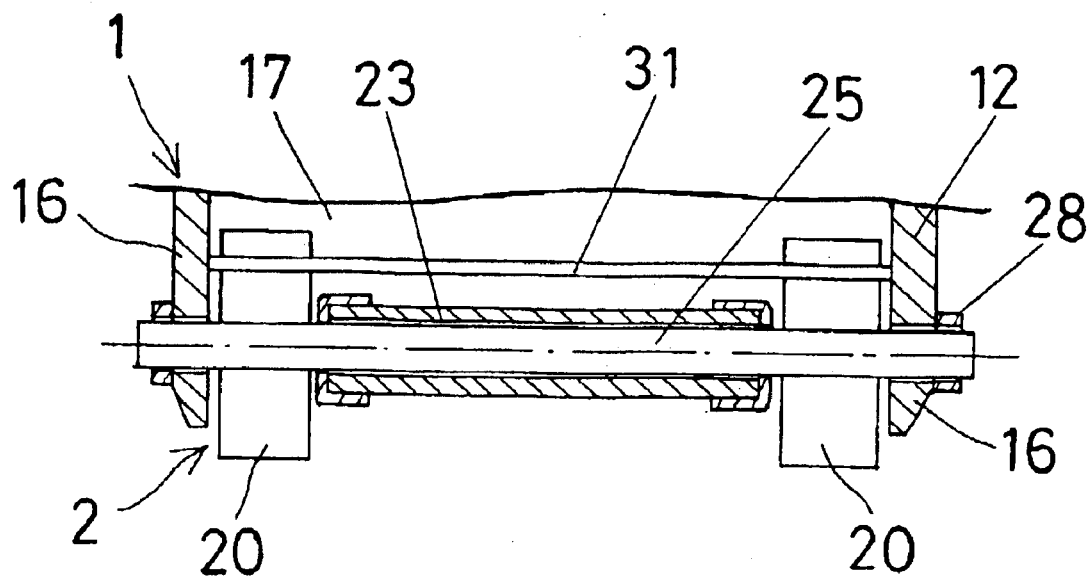
FIG. 4 is a partial cross sectional view taken along lines 4—4 of FIG. 3.
Figure 5:
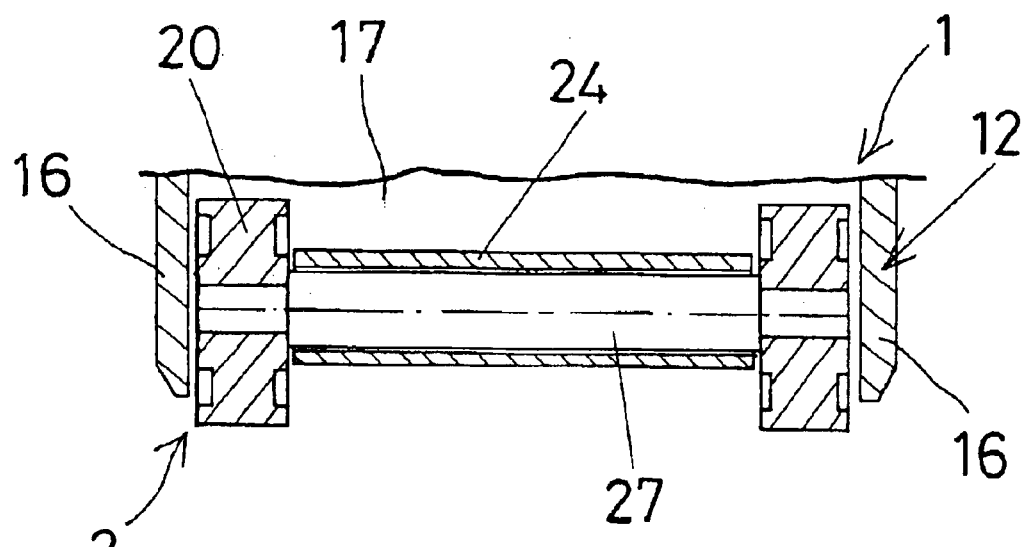
FIG. 5 is a partial cross sectional view taken along lines 5—5 of FIG. 3.

Referring to the drawings, and initially to FIGS. 1–3, a hobby or rocker horse or a rocker toy device in accordance with the present invention comprises a body 1 having a hobby horse configuration, and having a seat 10 formed or provided or secured above a base 12, and having a handle 11 provided on a head 14 that has a profile resembling a horse.

The base 12 includes a pair of elongate runners or walls 16 which are identical to each other and which are transversely spaced apart a distance that is preferably greater than the width of the seat 10. The base 12 includes one or more convex or curved rocker surfaces 13 formed in the bottom portion thereof, such as formed in the bottom portion of the walls 16 respectively, for providing rocking motion of the horse body 1 and the seat 10.

The base 12 includes a chamber 17 formed therein, such as formed in either the middle portion, the rear portion, or the front portion thereof, for receiving a wheel device 2 therein.

The wheel device 2 includes a frame 22 received in the chamber 17 of the base 12 and having a middle portion rotatably or pivotally secured to the base 12 with a lateral pivot shaft 25 which may be secured between the side walls 16 of the base 12, for allowing the frame 22 to be rotated relative to the base 12 about the pivot shaft 25, best shown in FIG. 3.

As best shown in FIGS. 2–5, the frame 22 includes a middle portion having a pipe 23 laterally secured or provided therein for rotatably receiving the pivot shaft 25 (FIG. 4), and for allowing the frame 22 to be smoothly and rotatably secured to the pivot shaft 25 of the base 12. The pivot shaft 25 may be secured to the base 12 with one or more retaining or clamping rings 28.

The frame 22 includes one end portion, such as the front portion having a tube 24 laterally secured or provided therein for rotatably receiving a pivot axle 27 (FIG. 5) to which one or more wheels 20, such as two front wheels 20 are attached or secured, such that the front wheels 20 may be rotatably attached to the front portion of the frame 22 with the pivot axle 27.

The frame 22 includes the other end portion, such as the rear portion having one or more wheels 21, such as two rear wheels 21 attached thereto with a spindle 29, for allowing the rear wheels 21 to be rotatably attached to the rear portion of the frame 22 with the spindle 29. The spindle 29 may be directly and rotatably secured to the frame 22, or to a further tube 26 (FIGS. 2, 3) of the frame 22.

As best shown in FIG. 3, the front wheels 20 and the rear wheels 21 are attached to the front and the rear portions of the frame 22, and the frame 22 is rotatable relative to the base 12 about the pivot shaft 25, such that the front wheels 20 and the rear wheels 21 may be rotated relative to the base 12, and rotatable outwardly or inwardly relative to the chamber 17 of the base 12.

A stop rod 30 is received in the chamber 17 of the base 12, and secured between the side walls 16 of the base 12, and located closer to the front portion of the frame 22, for engaging with the front portion of the frame 22, and for limiting the movement of the front wheels 20 relative to the base 12.

For example, as shown in dotted lines in FIG. 3, the front portion of the frame 22 and the front wheels 20 are rotatable or movable out of the chamber 17 of the base 12, and partially movable inwardly into the chamber 17 of the base 12.

The stop rod 30 may be engaged with the front portion of the frame 22 for allowing the front wheels 20 to be partially moved into the chamber 17 of the base 12, but may not be completely moved into the chamber 17 of the base 12, as shown in solid lines in FIG. 3, and for allowing the front wheels 20 to be engaged with the supporting surface or ground 70.

Another stop rod or a stop pole 31 is further provided and received in the chamber 17 of the base 12, and secured between the side walls 16 of the base 12, and located closer to the rear portion of the frame 22, for engaging with the rear portion of the frame 22, and for limiting the movement of the rear wheels 21 relative to the base 12.

For example, as shown in solid lines in FIG. 3, the rear wheels 21 are rotatable or movable relative to the base 12, and partially movable out of the chamber 17 of the base 12. As shown in dotted lines in FIG. 3, the rear wheels 21 may be completely moved and received in the chamber 17 of the base 12, for preventing the rear wheels 21 from being engaged with the supporting surface or ground 70.

The stop pole 31 may optionally be provided for engaging with the rear portion of the frame 22, and for preventing the rear wheels 21 from deeply engaging into the chamber 17 of the base 12. It is preferable that the stop pole 31 may be engaged with the frame 22, for allowing the rear wheels 21 to be just received or engaged into the chamber 17 of the base 12, at which moment, the rear wheels 21 will not be contacted with the supporting surface or ground 70.

In operation, as shown in FIG. 3, when the body 1 is conducted or operated with a rocking action, and at a position, such as a rear position where the rear portion of the rocker surface 13 is contacted with the ground 70, the front portion of the rocker surface 13 may be elevated or moved upwardly away from the ground 70. At this moment, the front wheels 20 may be moved out of the base 12 due to gravity action, and the rear wheels 21 will be received in the chamber 17 of the base 12, as shown in dotted lines in FIG. 3.

When the body 1 gradually rocks or moves forwardly to another position or middle position where the middle portion of the rocker surface 13 is contacted with the ground 70, or the front portion of the rocker surface 13 may be moved downwardly toward the ground 70. At this moment, the rear wheels 21 may be moved or forced into the chamber 17 of the base 12 by the ground 70, and the front wheels 20 may still be moved out of the base 12 due to the gravity action.

When the body 1 further rocks or moves forwardly to the other position, or the front portion where the front portion of the rocker surface 13 downwardly toward the ground 70, and where the frame 22 may be forced to engage with the stop rod 30, and where the front wheels 20 may be positioned or retained at the position partially extended outwardly of the base 12, as shown in solid lines in FIG. 3. At this moment, the body 1 may be moved relative to the ground 70, such as moved forwardly relative to the ground 70 by the front wheels 20.

As also shown in solid lines in FIG. 3, the rear wheels 21 may also be forced to engage with or to contact with the ground 70 when the front wheels 20 are forced to engage with the ground by the weight of the body 1, and when the body 1 rocks forwardly, such that the body 1 may be smoothly moved relative to the ground 70 by both the front and the rear wheels 20, 21.

After the body 1 has been moved relative to the ground 70 for a suitable distance by the front wheels 20, and due to the gravity action, the middle portion and the rear portion of the body 1 may then be moved downwardly toward the ground 70 by the rocking action, for moving or disengaging the front portion of the rocker surface 13 and the wheel device 2 upwardly away from the ground 70.

The front wheels 20 may be moved out of the base 12 again, due to the gravity action, when the middle portion of the rocker surface 13 is contacted with the ground 70 again. At this moment, the rear wheels 21 may also be moved or forced into the chamber 17 of the base 12 by the ground 70, again.

The body 1 may thus be moved relative to the ground 70 when the front portion of the body 1 is moved downwardly toward the ground 70, and the body 1 may not be moved relative to the ground 70 when the front portion of the body 1 is moved upwardly away from the ground 70, or when either the middle portion or the rear portion of the body 1 is moved downwardly toward and contacted with the ground 70.

Referring again to FIG. 3, the front wheels 20 are shown to be spaced further away from the pivot shaft 25 than the rear wheels 21, or the distance "D" between the front wheels 20 and the pivot shaft 25 is greater than the distance "d" between the rear wheels 21 and the pivot shaft 25.

However, the distances "D" and "d" between the front and the rear wheels 20, 21 and the pivot shaft 25 may also be adjusted by moving or adjusting the pivot shaft 25 relative to the frame 22. The stop rod 30 and the stop pole 31 may also be adjusted relative to the frame 22 or the wheels 20, 21, for positioning the front wheels 20 at the partially and outwardly extending position relative to the base 12, and for allowing the rear wheels 21 to be completely received in the chamber 17 of the base 12.

An additional lock pin 33 (FIG. 3) may optionally or selectively or further provided and secured to the base 12, and engaged with the frame 22, for solidly maintaining the front wheels 20 at the partially and outwardly extending position relative to the base 12, as shown in dotted lines in FIG. 3, and for allowing the body 1 to be moved relative to the ground 70 periodically by the front wheels 20.

It is to be noted that the wheel device 2 may also be received in either the middle portion or the rear portion of the base 12, and may also be arranged for allowing the body 1 to be moved relative to the ground 70 by one or more of the wheels 20, 21.

Accordingly, the rocker horse in accordance with the present invention includes a wheel device arranged for allowing the rocker horse to be moved relative to the supporting surface or ground, and also to be operated with in rocking operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A rocker device comprising:
    a body including a base having at least one rocker surface provided in bottom thereof for engaging with a supporting surface and for providing rocking motion of said body, and
    a wheel device attached to said bottom of said base and extended outwardly relative to said bottom of said base to selectively engage with the supporting surface, said wheel device including a frame rotatable secured to said base with a pivot shaft, said frame including a first end having at least one first wheel rotatable secured thereto and partially extended out of said base at a partially and outwardly extending position, to engage with the supporting surface, and said frame including a second end having at least one second wheel rotatable secured thereto and spaced away from said at least one first wheel, and
    said base being rockable relative to the supporting surface at a position where said wheel device is elevated and disengaged from the supporting surface, and another position where said wheel device is engaged with the supporting surface, to periodically move said body relative to the supporting surface with said wheel device when said wheel device is engaged with the supporting surface.

2. The rocker device according to claim 1, wherein said frame is rotatably secured to said base with a pivot shaft, and includes a tube attached thereto, and an axle rotatably secured to said tube, said at least one first wheel is attached to said axle.

3. The rocker device according to claim 2, wherein said frame includes a pipe secured thereto to rotatably receive said pivot shaft in said pipe.

4. The rocker device according to claim 1 further comprising a stop rod secured to said base and engageable with said frame, to position said at least one first wheel at said partially and outwardly extending position.

5. The rocker device according to claim 1, wherein said frame includes a second tube attached thereto, and a spindle rotatably received in said second tube, said at least one second wheel is secured to said spindle.

6. The rocker device according to claim 1, wherein said base includes a chamber formed therein for receiving said at least one second wheel.

7. The rocker device according to claim 1 further comprising a stop pole secured to said base and engageable with said frame, to limit a movement of said at least one second wheel relative to said base.

8. The rocker device according to claim 1, wherein said pivot shaft is provided between at least one first wheel and said at least one second wheel.

9. The rocker device according to claim 8, wherein said at least one first wheel is further spaced away from said pivot shaft than said at least one second wheel.

10. The rocker device according to claim 1, wherein said at least one second wheel is arranged to be contacted with the supporting surface when said at least one first wheel is contacted with the supporting surface.

11. The rocker device according to claim 1 further comprising a lock pin optionally secured to said base and engageable with said frame, to position said at least one first wheel at an outwardly extending position.

* * * * *